United States Patent [19]

Deux et al.

[11] Patent Number: 4,541,652
[45] Date of Patent: Sep. 17, 1985

[54] LIFTING AND STEERING DEVICE FOR A STEERING WHEEL OF A VEHICLE

[75] Inventors: Alain Deux, Angers; Jean C. Merant, Doue la Fontaine, both of France

[73] Assignee: Braud, Angers, France

[21] Appl. No.: 634,222

[22] Filed: Jul. 25, 1984

[30] Foreign Application Priority Data

Aug. 29, 1983 [FR] France ................................ 83 13839

[51] Int. Cl.[4] .......................... B62D 9/00; B62D 7/06
[52] U.S. Cl. ..................................... 280/672; 280/691;
280/693
[58] Field of Search ................ 280/93, 96.1, 660, 672,
280/691, 693, 702, 704, 709, 43, 43.17, 43.18,
43.23, 666, 670

[56] References Cited

U.S. PATENT DOCUMENTS

| 2,916,296 | 12/1959 | Muller | 280/709 |
|---|---|---|---|
| 3,558,148 | 1/1971 | Johnson | 280/702 |
| 3,604,725 | 9/1971 | Goff et al. | 280/672 |
| 3,741,581 | 6/1973 | Patrin | 280/670 |
| 3,820,818 | 6/1974 | Kress | 280/672 |
| 4,219,208 | 8/1980 | Fuller et al. | 280/96.1 |
| 4,340,237 | 7/1982 | Orlando | 280/672 |

FOREIGN PATENT DOCUMENTS

| 1103776 | 3/1961 | Fed. Rep. of Germany . |
|---|---|---|
| 2448654 | 4/1975 | Fed. Rep. of Germany . |
| 1571335 | 5/1969 | France . |
| 2185521 | 1/1974 | France . |
| 2210969 | 7/1974 | France . |
| 1095313 | 12/1967 | United Kingdom . |

Primary Examiner—Joseph F. Peters, Jr.
Assistant Examiner—Kenneth R. Rice
Attorney, Agent, or Firm—Gottlieb, Rackman & Reisman

[57] ABSTRACT

A lifting and steering device for a steering wheel of a vehicle comprising a main fixed tubular body, a second tube, a wheel support fixed rigidly to said second tube, a shaft mounted for rotation in the upper closed end of said tubular body, a first coupling means for coupling the upper end of said shaft to a steering control, a second coupling means for coupling said tube to said shaft so as to interlock them for rotation while allowing axial movement therebetween, and a hydraulic actuator for moving said second tube axially with respect to said shaft. The actuator is disposed inside said tube and one of the two elements of the actuator, namely its cylinder or its piston rod, is coupled to the tube whereas the other element of the actuator is coupled to said shaft.

7 Claims, 5 Drawing Figures

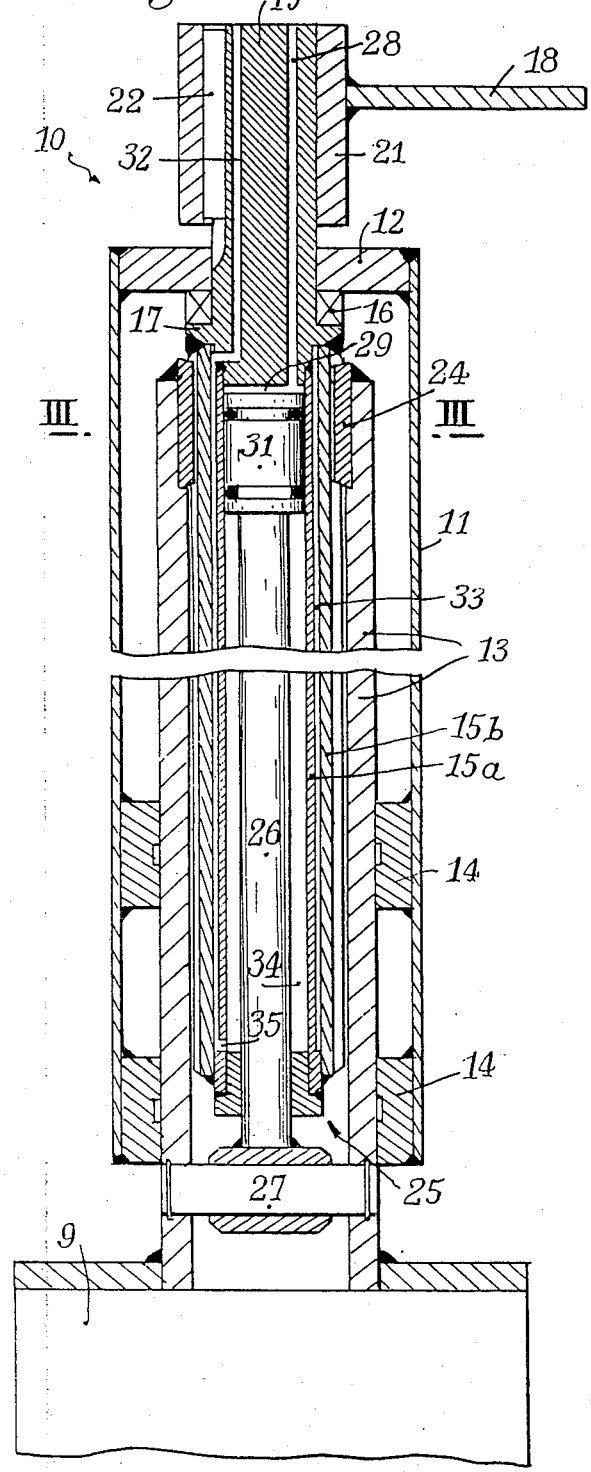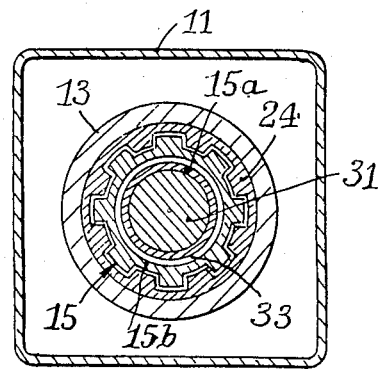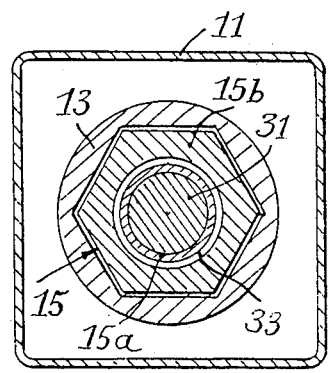

LIFTING AND STEERING DEVICE FOR A STEERING WHEEL OF A VEHICLE

BACKGROUND OF THE INVENTION

1. Field of the Invention

The present invention relates to a lifting and steering device for a steering wheel of a vehicle, of the type comprising a main fixed tubular body which extends substantially vertically and which has an upper end closed, a second tube which is disposed coaxially inside the main tubular body and is slidably mounted therein and projects beyond its lower end, a wheel support fixed rigidly to the lower end of the second tube, a shaft which is mounted for rotation in the closed upper end of the main tubular body and which extends axially inside this latter and the second tube, first coupling means for coupling the upper end of the shaft to a steering control of the vehicle, a second coupling means for coupling the second tube to the shaft so as to interlock them for rotation while allowing an axial movement of the second tube with respect to the shaft and a hydraulic cylinder for axially moving the second tube with respect to the shaft.

2. Description of the Prior Art

Lifting and steering devices of the above mentioned kind are used for example in some vehicles which have a high center of gravity and which are equipped with a hydraulic tilt correcting system which acts selectively on each of the wheels of the vehicle to correct its level position when it is travelling over sloping ground. This is particularly the case in a certain number of harvesting machines such as grape harvesting machines, coffee harvesting machines, machines for harvesting blackcurrants, raspberries and other berries.

A lifting and steering device is already known of the above described type (see U.S. Pat. No. 4,340,237), in which the main tubular body and the second tube form respectively the cylinder and the piston rod of the hydraulic cylinder. The piston of the cylinder is mounted for sliding inside the main tubular body and it is rigidly fixed to the upper end of the second tube whose lower end is sealingly closed in relation to the fluid. Furthermore, the part of the shaft which extends inside the main tubular body and the second tube has a non circular section and passes through a central aperture in the piston, which has a form corresponding to the non circular section of the shaft and which forms with this latter the second above mentioned coupling means.

In operation, the high forces applied to the wheel (driving, steering) by reaction with the ground introduce high stresses so deformations in the sliding parts of the lifting and steering device. In the lifting and steering device of the U.S. Pat. No. 4,340,237, these stresses and deformations cause rapid wear of the seals between the main tubular body and the piston on the one hand, and between the main tubular body and the second tube forming the piston rod, on the other. The result is leaks of pressurized fluid which adversely affect the operation of the lifting and steering device. In addition, the lower part of the second tube which slides in the lower end of the main tubular body and which extends outwardly thereof, is located at the level of the wheel and is then vulnerable to abrasion by the ground, the sand or the mud which, during operation, is thrown up by the wheel. The earth, sand and mud may thus cause wear of the seals between the main tubular body and the second tube and/or scratches on the outer surface of the second tube, which adversely affect the sealing of the hydraulic cylinder.

SUMMARY OF THE INVENTION

The aim of the present invention is essentially to overcome these drawbacks by providing a lifting and steering device in which the high forces applied to the wheel are practically not transmitted to the sliding elements of the hydraulic cylinder and in which these latter are well protected against earth or other dirt thrown up by the wheel, thus avoiding the problems of wear of the seals and the sliding elements of the hydraulic cylinder and the sealing faults which resulted therefrom in the prior known lifting and steering device.

To this end, the lifting and steering device of the present invention is characterized in that the hydraulic actuator is disposed inside the second tube and one of the two elements of the hydraulic actuator, namely its cylinder or its piston rod, is coupled to the second tube, whereas the other element of the hydraulic actuator is connected to the shaft.

Because the hydraulic actuator is disposed inside the second tube, its sliding elements are well protected against the projection of earth or other dirt. Furthermore, because the main tubular body and the second tube no longer form respectively the cylinder and the piston rod of the hydraulic actuator as was the case in the lifting and steering device of U.S. Pat. No. 4,340,237, the forces applied to the wheel are no longer transmitted directly to the sliding elements of the hydraulic actuator, but indirectly and in considerably smaller portions through the second coupling means between the second tube and the shaft and through the connection between the actuator and the second tube or wheel support. The result is that the sliding elements of the hydraulic actuator are subjected to practically no stress due to the forces applied to the wheel, so no deformations likely to cause wear of the seals and, consequently, sealing defects.

BRIEF DESCRIPTION OF THE DRAWINGS

A detailed description will now be given by way of example of two embodiments of the present invention with reference to the accompanying drawings in which:

FIG. 2 shows, in vertical section and on a larger scale, a first embodiment of the lifting and steering device of the invention;

FIG. 3 is a sectional view through line III—III of FIG. 2;

FIG. 4 is a view similar to FIG. 3, showing a variant; and

DESCRIPTION OF THE PREFERRED EMBODIMENTS

Figure 1:
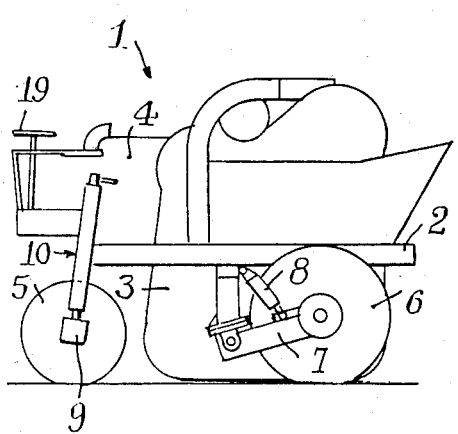
FIG. 1 is a view showing schematically in elevation a harvesting machine, such as a grape harvesting machine, comprising a hydraulic tilt correcting system using a lifting and steering device in accordance with the present invention.

FIG. 1 shows a harvesting machine 1, for example a grape harvesting machine, in which the lifting and steering device of the present invention may be used. The machine 1 comprises a chassis 2 which supports harvesting means 3 and a motor 4 for driving the operating parts of the machine. The chassis 2 may travel over the ground by means of four wheels, namely two front driving and steering wheels 5 and two rear wheels 6 (a single one of the two front wheels 5 and a single one the two rear wheels 6 can be seen in FIG. 1).

Machine 1 further comprises, in a way known per se, a hydraulic tilt correcting system which will not be described in detail in so far as such a system is well known and forms no part of the invention. It will be simply noted that such a system allows the height of the two wheels on the right hand side of the machine or the two wheels on the left hand side of the machine to be modified selectively with respect to the chassis, so as to compensate the cross tilt when the machine is working on a hill side while moving in a direction perpendicular to the slope of the ground. Some tilt correcting systems also allow the height of the two front wheels or the height of the two rear wheels to be modified selectively with respect to the chassis so as to compensate for the longitudinal tilt when the machine is moving in the direction of the slope. In any case, each of the two rear wheels 6 is mounted for rotation for example at the end of an arm 7 which is pivotably mounted to chassis 2 and which may be selectively lowered or raised by means of hydraulic actuating cylinder 8 connected to the hydraulic tilt correcting system. Similarly, each of the front steering wheels 5 is mounted for rotation in a support 9 which is connected to chassis 2 by a lifting and steering device 10. It is this latter which forms more particularly the subject matter of the present invention.

As can be seen in FIG. 2, the lifting and steering device 10 comprises a main tubular body 11 which extends substantially vertically and which is fixed rigidly to the chassis 2 of the machine 1 (FIG. 1) for example by welding or by any other appropriate fixing means. The upper end of tubular body 11 is closed by a plate 12. The tubular body 11 has preferably a square section as shown in FIGS. 3 and 4 but it could also have a circular section.

A second tube 13 is disposed coaxially inside the tubular body 11 and may slide in two rings 14 spaced axially apart and fixed to the tubular body 11 in the lower part thereof. The wheel support 9 is fixed, for example by welding, to the lower end of tube 13.

A shaft 15 is mounted for rotation in the end plate 12, a thrust ball-bearing 16 being inserted between the end plate 12 and a collar 17 of shaft 15 for supporting a part of the weight of the machine while allowing shaft 15 to rotate with respect to the tubular body 11, so with respect to the frame 2 of the machine.

Figure 5:
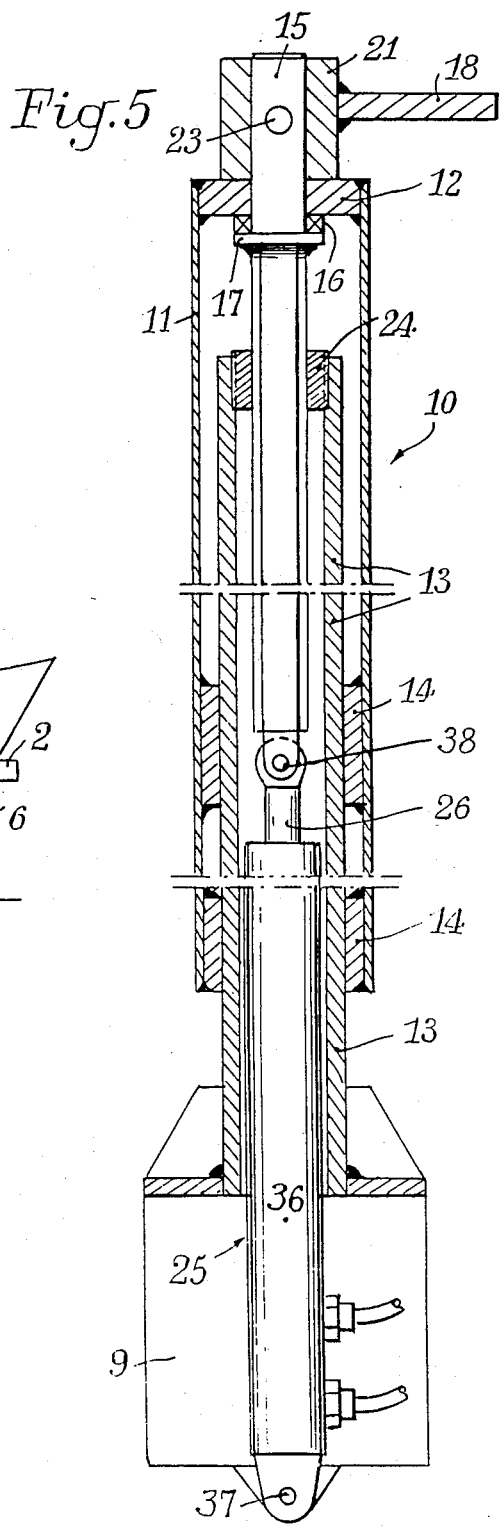
FIG. 5 shows, in vertical section, a second embodiment of the lifting and steering device of the present invention.

A rotational movement may be communicated to shaft 15 by means of a steering arm 18 which is connected to the steering wheel 19 (FIG. 1) by an appropriate transmission (not shown) and which is rigidly fixed to a steering hub 21 which is coupled to shaft 15 by a key 22 (FIG. 2) or by a pin 23 (FIG. 5).

The lower part of shaft 15 which extends inside the tubular body 11 has a non circular cross section. For example, as shown in FIG. 3, the outer surface of the lower part of shaft 15 comprises longitudinal splines. The lower splined part of shaft 15 passes through a ring 24 which is fixed rigidly to the upper end of tube 13 and whose inner surface comprises longitudinal splines having an arrangement and form complementary to those of shaft 15. Thus a coupling is provided between shaft 15 and tube 13 such that the tube 13 is interlocked for rotation with shaft 15 and may move axially with respect thereto. This coupling allows support 9, so wheel 5, to be rotated when shaft 15 is rotated by means of the steering wheel 19.

In a variant, instead of having a splined outer surface, the lower part of shaft 15 may have a polygonal section, for example hexagonal as shown in FIGS. 4 and 5, ring 24 then having an aperture of corresponding shape.

For lowering and raising the wheel support 9, so wheel 5 with respect to chassis 2 of the machine, that is to say for raising or lower chassis 2 with respect to the ground, tube 13 to the lower end of which the wheel support 9 is fixed may be moved axially with respect to shaft 15 and with respect to the tubular body 11, so with respect to chassis 2, by means of a hydraulic actuating cylinder 25.

In the embodiments shown in FIG. 2, the lower part of shaft 15 which extends inside the tubular body 11 and tube 13 is hollow and forms the cylinder of the hydraulic actuator 25. In this case, the piston rod 26 of the actuator 25 is coupled by a transverse shaft 27 to the lower end of tube 13. The upper end of shaft 15 comprises a first longitudinal passage 28 which opens into the chamber 29 of the hydraulic actuator, situated between its piston 31 and the upper end of its cylinder. At the upper end of shaft 15, passage 28 is connected by an appropriate connection (not shown), which may be for example a rotary seal, and by pipes and a fluid distributor to a pressurized fluid source (none of these elements being shown since they are quite conventional).

Preferably, actuator 25 is a double acting cylinder. In this case, the upper part of shaft 15 comprises a second longitudinal passage 32 which communicates with another longitudinal passage 33 formed in the wall of the cylinder of the hydraulic actuator. This other longitudinal passage 33 communicates with the other chamber 34 of the hydraulic actuator, situated between its piston 31 and the lower end of its cylinder, through at least one radial passage 35 formed in the lower part of the cylinder of the hydraulic actuator. Like the longitudinal passage 28, the longitudinal passage 32 is connected to the pressurized fluid source through another connection, other pipes and the above mentioned fluid distributor which is a four way distributor. As shown in FIGS. 2 to 4, the lower part of shaft 15 which forms the cylinder of actuator 25 may be formed by two concentric tubes, respectively an inner tube 15a and an outer tube 15b, forming therebetween an annular space which defines the above mentioned longitudinal passage 33. The upper ends of the two tubes 15a and 15b are fixed coaxially to the upper part of shaft 15, whereas their lower ends are closed as shown in FIG. 2. The piston rod 26 passes through the lower closed end of the inner tube 15a and the above mentioned radial passage 35 is formed in the inner tube 15a. In this case, the outer tube 15b comprises longitudinal supply means in its outer surface as shown in FIG. 3 or it has a non circular cross section, for example a hexagonal cross section as shown in FIG. 4.

In the embodiment shown in FIG. 5, the elements which are identical which play the same role as those in the embodiments shown in FIG. 2 are designated by the same reference numbers and will not be described again in detail. The embodiment shown in FIG. 5 differs from that shown in FIG. 2 in that shaft 15 is solid throughout its length. In this case, the cylinder 36 of the hydraulic actuator 25 is freely engaged in the lower part of tube 13 and its lower end is secured at 37 to the wheel support 9; whereas the piston rod 26 of the hydraulic actuator 25 has its upper end which is coupled at 38 to the lower end of shaft 15.

In the two embodiments it will be noted that the hydraulic actuator 25 is housed inside tube 13 (except a small part of the cylinder 36 of actuator 25 in the embodiment of FIG. 5) and that, in both cases, the sliding elements of the hydraulic actuator 25 are well protected against earth or other dirt thrown up by the wheel 5. It is also clear that the forces applied to the wheel, by reaction with the ground, are not applied directly to the sliding elements of the hydraulic actuator 25 but are principally applied to tube 13 and to the main tubular body 11, so that the sliding elements of the hydraulic actuator 35 undergo no or practically no deformation due to these forces and that the hydraulic actuator works thus under good conditions.

As was seen earlier on, the hydraulic actuator 25 is preferably a double acting cylinder. This increases the anti-kick torque of the machine when it is climbing a slope. In fact, in this case, the oil which is imprisoned in the lower chamber 34 of the actuator 25 of FIG. 2 (or in the upper chamber of the actuator 25 of FIG. 5) forms a rigid connection between the piston rod 26 of the actuator and its cylinder. Thus, when the machine tends to kick, the front wheels 5 lift off the ground so that the weight of the two front wheels 5, their wheel support 9 and the associated tubes 13 create an antagonistic torque which opposes the kicking torque. On the other hand, if the actuator 25 were a single acting cylinder, as is the case in U.S. Pat. No. 4,340,237, under the same circumstances the front wheels 5 would remain on the ground so that their weight could not be used for creating an anti-kick torque.

It goes without saying that the two embodiments of the present invention described above by way of example are given purely as an indication and are in no wise limiting and that numerous modifications may be readily made by a man skilled in the art without for all that departing from the scope and spirit of the invention.

What is claimed is:

1. In a lifting and steering device for a steering wheel of a vehicle comprising a fixed tubular body which extends substantially vertically and which has one closed upper end, a second tube disposed coaxially inside said tubular body for sliding therein and projecting beyond its lower end, a wheel support fixed rigidly to the lower end of said second tube, a shaft which is mounted for rotation in the upper closed end of said main tubular body and which extends axially inside this latter and the second tube, first coupling means for coupling the upper end of said shaft to a steering control of the vehicle, a second coupling means for coupling said second tube to said shaft so as to interlock them for rotation while allowing axial movement of the second tube with respect to the shaft and a hydraulic actuating cylinder for moving said second tube axially with respect to said shaft, said hydraulic actuator is disposed inside said second tube and one of the two elements of said hydraulic actuator, namely its cylinder or its piston rod is coupled to said second tube whereas the other element of the hydraulic actuator is connected to said shaft.

2. The lifting and steering device as claimed in claim 1, wherein the part of said shaft which extends inside said main tubular body and said second tube is hollow and forms the cylinder of said hydraulic actuator, and the piston rod of said hydraulic actuator is coupled to the lower end of said second tube.

3. The lifting and steering device as claimed in claim 2, wherein the upper part of said shaft comprises a first longitudinal passage which opens into the chamber of the hydraulic actuator, situated between its piston and the upper end of its cylinder, for supplying said chamber with pressurized fluid.

4. The lifting and steering device as claimed in claim 3, wherein said hydraulic actuator is a double acting cylinder and the upper part of said shaft comprises a second longitudinal passage which communicates with another longitudinal passage formed in the wall of the cylinder of the hydraulic actuator, said other longitudinal passage communicating with the other chamber of the hydraulic actuator, situated between its piston and the lower end of its cylinder, through at least one radial passage formed in the lower part of the cylinder of the hydraulic actuator.

5. The lifting and steering device as claimed in claim 4, wherein the cylinder of said hydraulic actuator is formed by two concentric tubes, respectively an inner tube and an outer tube, forming therebetween an annular space which defines said other longitudinal passage, the upper ends of the two tubes being fixed coaxially to the upper part of said shaft, whereas their lower ends are closed, the piston rod passing through the lower closed end of the inner tube and said radial passage being formed in the inner tube.

6. The lifting and steering device as claimed in claim 1, wherein the cylinder of said hydraulic actuator is freely engaged in the lower part of said second tube and has its lower end secured to said wheel support, and the piston rod of said hydraulic actuator has its upper end coupled to the lower end of said shaft.

7. The lifting and steering device as claimed in claim 6, wherein said hydraulic actuator is a double acting cylinder.

* * * * *